(12) United States Patent
Mathews et al.

(10) Patent No.: US 9,074,895 B2
(45) Date of Patent: Jul. 7, 2015

(54) TRAJECTORY PLANNING

(75) Inventors: George Morgan Mathews, Bexley (AU); Markus Deittert, Bristol (GB); Arthur George Richards, Bristol (GB)

(73) Assignee: BAE SYSTEMS plc, London (GB)

( * ) Notice: Subject to any disclaimer, the term of this patent is extended or adjusted under 35 U.S.C. 154(b) by 71 days.

(21) Appl. No.: 13/980,328

(22) PCT Filed: Jan. 10, 2012

(86) PCT No.: PCT/GB2012/050041
§ 371 (c)(1),
(2), (4) Date: Sep. 27, 2013

(87) PCT Pub. No.: WO2012/098375
PCT Pub. Date: Jul. 26, 2012

(65) Prior Publication Data
US 2014/0012493 A1 Jan. 9, 2014

(30) Foreign Application Priority Data

Jan. 18, 2011 (GB) .................................. 1100843.0

(51) Int. Cl.
*G01C 21/00* (2006.01)
*G09B 23/10* (2006.01)
(52) U.S. Cl.
CPC ................ *G01C 21/00* (2013.01); *G09B 23/10* (2013.01)
(58) Field of Classification Search
CPC ...................................................... G01C 21/00
USPC ................................................. 701/400, 467
See application file for complete search history.

(56) References Cited

U.S. PATENT DOCUMENTS

| 7,079,943 B2 | 7/2006 | Flann et al. |
| 7,110,881 B2 | 9/2006 | Gray et al. |

(Continued)

FOREIGN PATENT DOCUMENTS

| EP | 1 693 649 A2 | 8/2006 |
| EP | 2 159 121 A1 | 3/2010 |

(Continued)

OTHER PUBLICATIONS

Egerstedt, Magnus et al., "Trajectory planning in the infinity norm for linear control systems", 2007, Texas Tech University, 30 pages, downloaded from http://citeseerx.ist.psu.edu/viewdoc/download?doi=10.1.1.46.3050&rep=rep1&type=pdf.*

(Continued)

*Primary Examiner* — Behrang Badii
*Assistant Examiner* — David Testardi
(74) *Attorney, Agent, or Firm* — Finch & Maloney PLLC

(57) ABSTRACT

A method and apparatus for determining a trajectory for a vehicle are disclosed, wherein the method can include identifying a starting position ($p_0$) for the vehicle; identifying a desired terminal position (P) for the vehicle; linearly approximating dynamics of the vehicle; and using the starting position ($p_0$), the desired terminal position (P), and the linear approximation, determining the trajectory for the vehicle. The linear approximation can be constrained by requirements that: an acceleration of the vehicle during the trajectory is less than a threshold value for the acceleration; and the threshold value for the acceleration is dependent on an infinity norm of a velocity of the vehicle. The vehicle may have a curvature limit.

10 Claims, 7 Drawing Sheets

(56) References Cited

U.S. PATENT DOCUMENTS

| | | | |
|---|---|---|---|
| 7,248,952 | B2 | 7/2007 | Ma et al. |
| 7,277,792 | B2 | 10/2007 | Overschie |
| 7,363,154 | B2 | 4/2008 | Lindores |
| 8,386,110 | B2 | 2/2013 | Maekawa et al. |
| 8,612,077 | B2 * | 12/2013 | Phillips et al. .................. 701/22 |
| 8,694,382 | B2 | 4/2014 | Aznavorian et al. |
| 2005/0171684 | A1 | 8/2005 | Turner |
| 2009/0109567 | A1 | 4/2009 | Ishihara et al. |
| 2009/0240480 | A1 * | 9/2009 | Baramov .......................... 703/6 |
| 2011/0301723 | A1 * | 12/2011 | Pekar et al. ..................... 700/29 |
| 2012/0239287 | A1 | 9/2012 | Pieper et al. |
| 2013/0304368 | A1 | 11/2013 | Mathews et al. |
| 2013/0304369 | A1 | 11/2013 | Mathews et al. |
| 2014/0012493 | A1 | 1/2014 | Mathews et al. |
| 2014/0058657 | A1 | 2/2014 | Mathews et al. |

FOREIGN PATENT DOCUMENTS

| | | |
|---|---|---|
| JP | 63-314614 A | 12/1988 |
| JP | 2009/096349 A | 5/2009 |
| WO | WO 03/019430 A1 | 3/2003 |
| WO | WO 2006/110576 A2 | 10/2006 |
| WO | WO 2007/123438 A | 11/2007 |

OTHER PUBLICATIONS

Hazell, Andrew, "Discrete time optimal preview control", Ph.D Thesis, University of London, Feb. 2008, 181 pages.*

Kim, Chang Sup et al., "H∞ steering control system for the unmanned vehicle", Proc. IEEE Intl. Symposium on Industrial Electronics, 2001 ISIE 2001, pp. 1441ff.*

Kuwata, Yoshiaki et al., "Distributed robust receding horizon control for multivehicle guidance", IEEE Transactions on Control Systems Technology, vol. 15 No. 4, Jul. 2007, pp. 627ff.*

Kuwata, Yoshiaki et al., "Robust cooperative decentralized trajectory optimization using receding horizon MILP", Proc. 2007 American Control Conference, NYC, Jul. 11-13, 2007, pp. 522ff.*

Richards, Arthur et al., "Aircraft trajectory planning with collision avoidance using mixed integer linear programming", Proc. 2002 American Control Conference, Anchorage, AK, May 8-10, 2002, pp. 1936ff.*

Richards, Arthur George, "Robust constrained model predictive control", Ph.D Thesis, Masachusetts Institute of Technology, Feb. 2005, 209 pages.*

Ron, Amos, "Lecture 14: Linear Algebra", Lecture notes for CS412: Introduction to Numerical Analysis, Oct. 26, 2010, 8 pages.*

Schouwenaars, Tom et al. "Decentralized Cooperative Trajectory Planning of Multiple Aircraft with Hard Safety Guarantees", AIAA Guidance, Navigation, and Control Conference and Exhibit, Aug. 16-19, 2004, Providence, R.I., Paper AIAA 2004-5141, 14 pages.

Schouwenaars, Tom, "Safe Trajectory Planning of Autonomous Vehicles", Ph.D. Thesis, Massachusetts Institute of Technology, Feb. 2006, 163 pages.

Culligan, Kieran Forbes, "Online Trajectory Planning for UAVs Using Mixed Integer Linear Programming", Master'Thesis, Massachusetts Institute of Technology, Aug. 2006, 100 pages.

Richards, Arthur, "Aircraft Trajectory Planning with Collision Avoidance Using Mixed Integer Linear Programming", Proceedings of the American Control Conference, 2002, Paper ACC02-AIAA 1057, 8 pages.

Schouwenaars, Tom et al., "Hyrid Architecture for Full-Envelope Autonomous Rotorcraft Guidance", Proceedings of the American Helicopter Society 59th Annual Forum, May 2003, 22 pages.

Schouwenaars, T. et al., "Linear Programming and Language Processing for Human Unmanned-Aerial-Vehicle Team Missions", Journal of Guidance, Control, and Dynamics, vol. 29, No. 2, Mar.-Apr. 2006, pp. 303ff.

Schouwenaars, Tom et al., "Receding Horizon Path Planning with Implicit Safety Guarantees", Proceeding of the 2004 American Control Conference, Boston, Massachusetts Jun. 30-Jul. 2, 2004, Paper FrP12.4, pp. 5576.

Kuwata, Yoshiaki, "Real-time Trajectory Design for Unmanned Aerial Vehicles using Receding Horizon Control", Master'Thesis, Massachusetts Institute of Technology, Jun. 2003, 151 pages.

International Search Report (PCT/ISA/210) issued on Jun. 1, 2012, by the European Patent Office as the International Searching Authority for International Application No. PCT/GB2012/050038.

Written Opinion (PCT/ISA/237) issued on Jun. 1, 2012, by the European Patent Office as the International Searching Authority for International Application No. PCT/GB2012/050038.

United Kingdom Search Report for GB 1100841.4 dated Jul. 21, 2011.

International Search Report (PCT/ISA/210) issued on Jun. 5, 2012, by the European Patent Office as the International Searching Authority for International Application No. PCT/GB2012/050039.

Written Opinion (PCT/ISA/237) issued on Jun. 5, 2012, by the European Patent Office as the International Searching Authority for International Application No. PCT/GB2012/050039.

United Kingdom Search Report for GB 1100844.8 dated Jul. 21, 2011.

International Search Report (PCT/ISA/210) issued on Jun. 1, 2012, by the European Patent Office as the International Searching Authority for International Application No. PCT/GB2012/050040.

Written Opinion (PCT/ISA/237) issued on Jun. 1, 2012, by the European Patent Office as the International Searching Authority for International Application No. PCT/GB2012/050040.

United Kingdom Search Report for GB 1100840.6 dated Jul. 21, 2011.

International Search Report (PCT/ISA/210) issued on Jun. 1, 2012, by the European Patent Office as the International Searching Authority for International Application No. PCT/GB2012/050041.

Written Opinion (PCT/ISA/237) issued on Jun. 1, 2012, by the European Patent Office as the International Searching Authority for International Application No. PCT/GB2012/050041.

United Kingdom Search Report for GB 1100843.0 dated Jul. 21, 2011.

M. Deittert et al., "Receding Horizon Control in Unknown Environments: Experimental Results", 2010 IEEE International Conference on Robotics and Automation, May 3-8, 2010, pp. 3008-3013.

J.H. Reif et al., "Approximate Kinodynamic Planning Using L2-Norm Dynamic Bounds", Computers and Mathematics with Applications, 1994, pp. 29-44, vol. 27, No. 5.

Ademoye, Taoridi et al., "Path planning via CPLEX optimization", 40th IEEE Southeastern Symposium on System Theory, Mar. 16-18, 2008, Paper MB1.2, pp. 92-96.

Richards, Arthur et al., "Experimental demonstrations of real-time MILP control", AIAA Guidance, Navigation, and Control Conference and Exhibit Aug. 11-14, 2003, Austin, Texas, Paper AIAA 2003-5802, 11 pages.

Non-Final U.S. Office Action received for U.S. Appl. No. 13/980,321, mail date Jun. 26, 2014, 26 pages.

Final U.S. Office Action received for U.S. Appl. No. 13/980,321, mail date Nov. 3, 2014, 20 pages.

Kuwata, Yoshiaki, "Trajectory panning for unmanned vehicles using robust receding horizon control", Ph. D. Thesis, Massachusetts Institute of Technology, Feb. 2007, 223 pages.

Supplemental notes from AOE 3104 (Virginia Tech), Vehicle Performance, 2003, 12 pages, downloaded from http://www.dept.aoe.vt.edu/~lutz/AOE3104/turningflight.pdf.

Excerpt from, "A policy on geometric design of highways and streets", 2004, AASHTO, pp. 18-43, downloaded from: http://design.transportation.org/Documents/TrunRadii,GreenBook2004.pdf.

* cited by examiner

TRAJECTORY PLANNING

FIELD OF THE INVENTION

The present invention relates to trajectory planning and apparatus for the planning of trajectories for vehicles.

BACKGROUND

Trajectory planning methodologies, for example using Mixed Integer Linear Programming (MILP), are used to determine globally optimal trajectories for vehicles. Many trajectory planning methodologies constrain vehicle trajectories with a linear approximation of the vehicle's dynamics.

Typically, a linear approximation of the vehicle's dynamics does not contain a notion of vehicle heading. This is typically because the introduction a heading angle introduces non-linearities. As a result, a determined trajectory may feature motion that cannot be achieved by conventional wheeled or tracked vehicles.

SUMMARY OF THE INVENTION

In a first aspect, the present invention provides a method for determining a trajectory for a vehicle, the method comprising: identifying a starting position for the vehicle; identifying a desired terminal position for the vehicle; linearly approximating dynamics of the vehicle; and using the starting position, the desired terminal position, and the linear approximation, determining the trajectory for the vehicle; wherein the linear approximation is constrained by requirements that: an acceleration of the vehicle during the trajectory is less than a threshold value for the acceleration; and the threshold value for the acceleration is dependent on an infinity norm of a velocity of the vehicle.

The constraint that the acceleration of the vehicle during the trajectory is less than the threshold value for the acceleration, and the threshold value for the acceleration is dependent on an infinity norm of a velocity of the vehicle may be implemented using the following:

$$\forall k \in [0, \ldots, N_{steps}], \forall m \in [1, \ldots, N_{cir}] \quad \text{(i)}$$
$$a_x(k)\sin\left(\frac{2\pi m}{N_{cir}}\right) + a_y(k)\cos\left(\frac{2\pi m}{N_{cir}}\right) \leq a_{max}(k)$$

$$\forall k \in [0, \ldots, N_{steps}], \forall p \in [1, \ldots, N_{pol}] \quad \text{(ii)}$$
$$m(p)v_x(k) + c(p) \geq a_{max}(p) - C_L b1(k, p)$$
$$m(p)v_y(k) + c(p) \geq a_{max}(p) - C_L b2(k, p)$$

$$\forall k \in [0, \ldots, N_{steps}] \quad \text{(iii)}$$
$$\sum_{p=1}^{N_{pol}} (b1(k, p) + b2(k, p)) \leq 2N_{pol} - 1$$

$$\forall k \in [0, \ldots, N_{steps}] \quad \text{(iv)}$$
$$a_{max}(k) \geq 0$$

where:
- $a_{max}$ maximum acceleration of the vehicle;
- $a_x$ is an acceleration of the vehicle in an x-direction;
- $a_y$ is an acceleration of the vehicle in a y-direction;
- $v_x$ is a velocity of the vehicle in an x-direction;
- $v_y$ is a velocity of the vehicle in a y-direction;
- $N_{steps}$ is a number of time-steps for the trajectory;
- $N_{cir}$ is a number of corners of a polygon;
- $N_{pol}$ is a number of linear functions, each linear function relating the maximum acceleration of the vehicle to an infinity norm of the velocity of the vehicle;
- $m(p)$ is a value of a gradient of a pth linear function;
- $c(p)$ is a value of pth linear function if the value of the velocity of the vehicle is zero;
- $b1(k, p)$ and $b2(k, p)$ are constants; and
- $C_L$ is a constant.

The linear approximation may be further constrained by a requirement that a magnitude of a velocity of the vehicle is greater than or equal to a threshold value for the velocity. This constraint may be implemented using the following:

$$\forall k \in [0, \ldots, N_{steps}], \forall m \in [1, \ldots, N_{circ}]$$
$$v_x(k)\sin\left(\frac{2\pi m}{N_{circ}}\right) + v_y(k)\cos\left(\frac{2\pi m}{N_{circ}}\right) \geq V_{min} - p(k, m) \cdot C_1$$

and $$\forall k \in [0, \ldots, N_{steps}]$$
$$\sum_{m=1}^{N_{circ}} p(k, m) = N_{circ} - 1$$

where:
- $v_x(k)$ is the velocity of the vehicle in an x-direction;
- $v_y(k)$ is the velocity of the vehicle in a y-direction;
- $V_{min}$ is the threshold velocity value;
- $N_{steps}$ is a number of time-steps for the trajectory;
- $N_{circ}$ is a number of corners of a polygon;
- $p(k, m)$ is a binary decision variable; and
- $C_1$ is a constant.

$C_1$ may be relatively large compared to $V_{min}$.

The linear approximation may be further constrained by requirements that: an acceleration applied to the vehicle at a point on the trajectory is relatively large when the acceleration acts in a direction that is substantially perpendicular to the velocity of the vehicle; and an acceleration applied to the vehicle at a point on the trajectory is relatively small when the acceleration acts in a direction that is substantially parallel to the velocity of the vehicle.

This constraint may be implemented using the following:

$$\forall k \in [0, \ldots, N_{steps}], \forall m \in [1, \ldots, N_{circs}]$$
$$\left(\frac{a_x(k)R_{min}}{V_{max}} - \frac{\lambda v_x(k)}{V_{max}}\right)\cos\left(\frac{2\pi m}{N_{circs}}\right) +$$
$$\left(\frac{a_y(k)R_{min}}{V_{max}} - \frac{\lambda v_y(k)}{V_{max}}\right)\sin\left(\frac{2\pi m}{N_{circs}}\right) \leq \sqrt{1 + \lambda^2}$$

where:
- $v_x(k)$ is the velocity of the vehicle in an x-direction;
- $v_y(k)$ is the velocity of the vehicle in a y-direction;
- $V_{max}$ is a maximum velocity of the vehicle;
- $N_{steps}$ is a number of time-steps for the trajectory;
- $N_{circs}$ is a number of corners of a polygon;
- $R_{min}$ is a minimum turn radius of the vehicle; and
- $\lambda$ is a constant.

The linear approximation may be further constrained by a requirement that the vehicle may not travel in a given region; a centre point of the region is at a distance from a predetermined point on the vehicle substantially equal to a minimum turn radius of the vehicle, in a direction substantially perpendicular to a velocity of the vehicle; and a distance from the centre point of the region to a point on a perimeter of the region is greater than or substantially equal to the minimum turn radius of the vehicle.

The constraint that the vehicle may not travel in a given region may be implemented using the following:

$$\forall k \in [0, \ldots, N_{steps}], \forall m \in [1, \ldots, N_{regions}]$$

$$(r_x(k) - r_{0x} - R_{min}v_{nx})\cos\left(\frac{2\pi m}{N_{regions}}\right) +$$

$$(r_y(k) - r_{0y}R_{min}v_{ny})\sin\left(\frac{2\pi m}{N_{regions}}\right) \geq R_{min} - C_2 p(k, m)$$

with $$\forall k \in [0, \ldots, N_{steps}]$$

$$\sum_{m=1}^{N_{circ}} p(k, m) = N_{regions} - 1$$

where:
- $v_{nx}$ is the normalised velocity of the vehicle in an x-direction;
- $v_{ny}$ is the normalised velocity of the vehicle in a y-direction;
- $r_x(k)$ is a position of the vehicle from an origin in the x-direction;
- $r_y(k)$ is a position of the vehicle from an origin in the y-direction;
- $r_{0x}$ is an initial position of the vehicle from an origin in the x-direction;
- $r_{0y}$ is an initial position of the vehicle from an origin in the y-direction;
- $N_{steps}$ is a number of time-steps for the trajectory;
- $N_{regions}$ is a number of corners of a polygon;
- $R_{min}$ is a minimum turn radius of the vehicle;
- p(k,m) is a binary decision variable; and
- $C_2$ is a constant.

$C_2$ may be relatively large compared to $R_{min}$.

The method may further comprise: determining one or more further linear approximations of the dynamics of the vehicle; and using the one or more further linear approximations, determining one or more further trajectories for the vehicle; wherein the trajectory and the one or more further trajectories are for implementation by the vehicle in series; each of the one or more further linear approximations is constrained by one or more of the following: (i) a requirement that a magnitude of a velocity of the vehicle is greater than or equal to a threshold value for the velocity; (ii) requirements that: an acceleration applied to the vehicle at a point on the trajectory is relatively large when the acceleration acts in a direction that is substantially perpendicular to the velocity of the vehicle; and an acceleration applied to the vehicle at a point on the trajectory is relatively small when the acceleration acts in a direction that is substantially perpendicular to the velocity of the vehicle; (iii) a requirement that the vehicle may not travel in a given region; a centre point of the region is at a distance from a predetermined point on the vehicle substantially equal to a minimum turn radius of the vehicle, in a direction substantially perpendicular to a velocity of the vehicle; and a distance from the centre point of the region to a point on a perimeter of the region is greater than or substantially equal to the minimum turn radius of the vehicle; and (iv) requirements that an acceleration of the vehicle during the trajectory is less than a threshold value for the acceleration, and the threshold value for the acceleration is dependent on an infinity norm of a velocity of the vehicle.

The vehicle may have a curvature limit for its trajectory.

In a further aspect the present invention provides apparatus for determining a trajectory for a vehicle, the apparatus comprising one or more processors arranged to: linearly approximate dynamics of the vehicle; and using an identified starting position for the vehicle, an identified desired terminal position for the vehicle, and the linear approximation, determine a trajectory for the vehicle; wherein the linear approximation is constrained by requirements that: an acceleration of the vehicle during the trajectory is less than a threshold value for the acceleration; and the threshold value for the acceleration is dependent on an infinity norm of a velocity of the vehicle.

In a further aspect the present invention provides a program or plurality of programs arranged such that when executed by a computer system or one or more processors it/they cause the computer system or the one or more processors to operate in accordance with the method of any of the above aspects of the invention.

In a further aspect the present invention provides a machine readable storage medium storing a program or at least one of the programs according to the above aspect of the invention.

DETAILED DESCRIPTION

Figure 1:
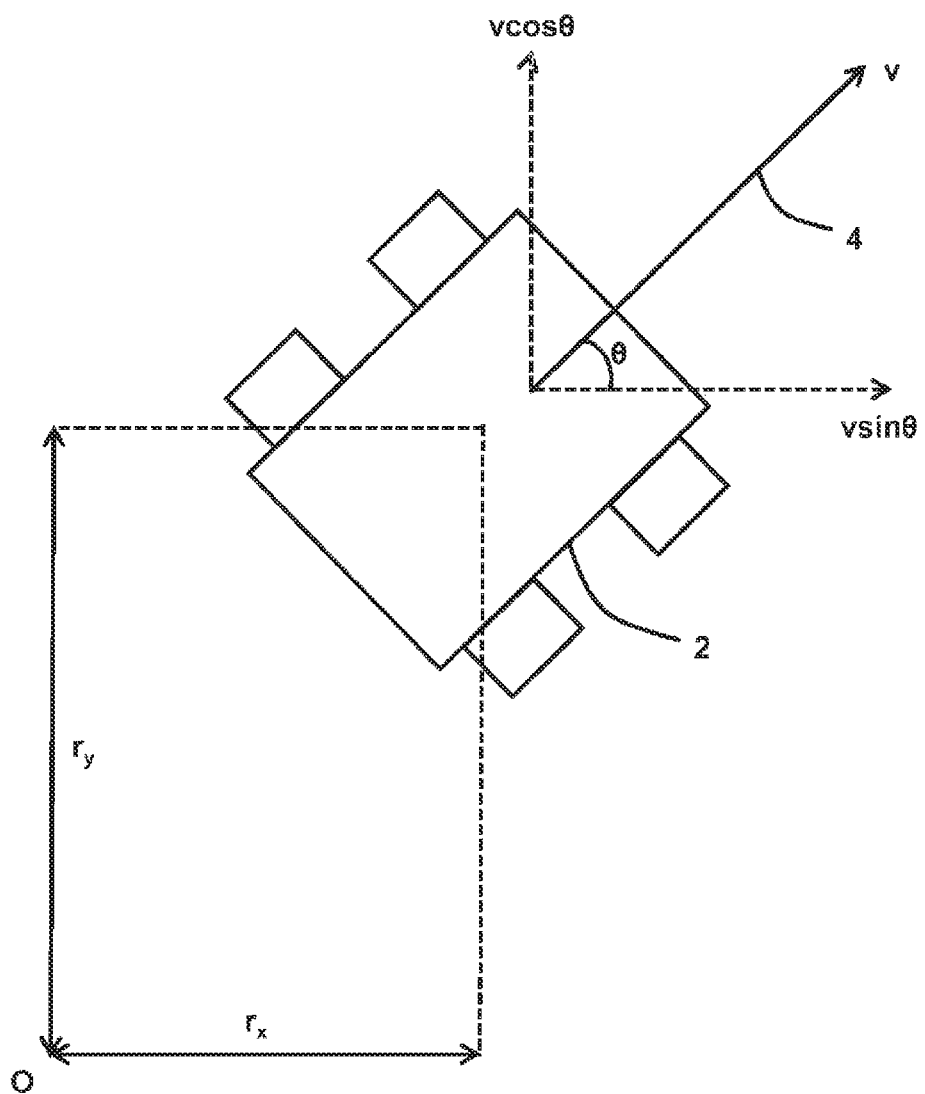
FIG. 1 is a schematic illustration (not to scale) of a land based vehicle for which an embodiment of a method of performing path planning is to be implemented.

FIG. 1 is a schematic illustration (not to scale) of a land based vehicle, hereinafter referred to as "the vehicle 2", for which an embodiment of a trajectory planner (not shown) plans a trajectory. The terminology "trajectory" is used herein to refer to a route of the vehicle from a first position to a second position.

The following information about a state and operation of the vehicle 2, described with reference to FIG. 1 and FIG. 2, will be useful in understanding the embodiment described later below.

The vehicle 2 has the following state vector x:

$$x = \begin{pmatrix} r_x \\ r_y \\ \theta \end{pmatrix}$$

where:
- $r_x$ is a distance of the vehicle 2 from an origin O in the x-direction, as indicated in FIG. 1;
- $r_y$ is a distance of the vehicle 2 from the origin O in the y-direction, as indicated in FIG. 1; and
- θ is an angle between the x-axis and a heading of the vehicle, hereinafter referred to as "the heading" and indicated in FIG. 1 by a solid arrow and the reference numeral 4.

Also, $$\dot{x} = \begin{pmatrix} v\sin\theta \\ v\cos\theta \\ \omega \end{pmatrix}$$

where:
- $\dot{x}$ is the time derivative of the state vector x;
- v is a value of the speed of the vehicle that the vehicle travels with (in the direction of the vehicle's heading 4); and
- ω is the curvature of the vehicle's path.

In this embodiment, the vehicle 2 has the following input vector u:

$$u = \begin{pmatrix} v \\ \omega \end{pmatrix}$$

The input vector u is constrained as follows:

$$\|v\| \leq V_{max}$$

$$\|\omega\| \leq \omega_{max}$$

where $V_{max}$ and $\omega_{max}$ are maxima of the vehicle's speed and angular velocity respectively.

In this embodiment, the state vector x of the vehicle 2 is linearised by replacing the heading 4 with components of the speed v in the x- and y-directions, i.e.:

$$x = \begin{pmatrix} r_x \\ r_y \\ v\sin\theta \\ v\cos\theta \end{pmatrix}$$

The dynamics of the system are given by a linear time-invariant system of the form:

$$\dot{x} = Ax + Bu$$

Because the vehicle's speed v is part of the state vector x, the linearised form of the input vector U comprises acceleration components in the x- and y-directions, i.e.

$$u = \begin{pmatrix} a_x \\ a_y \end{pmatrix}$$

Figure 2:
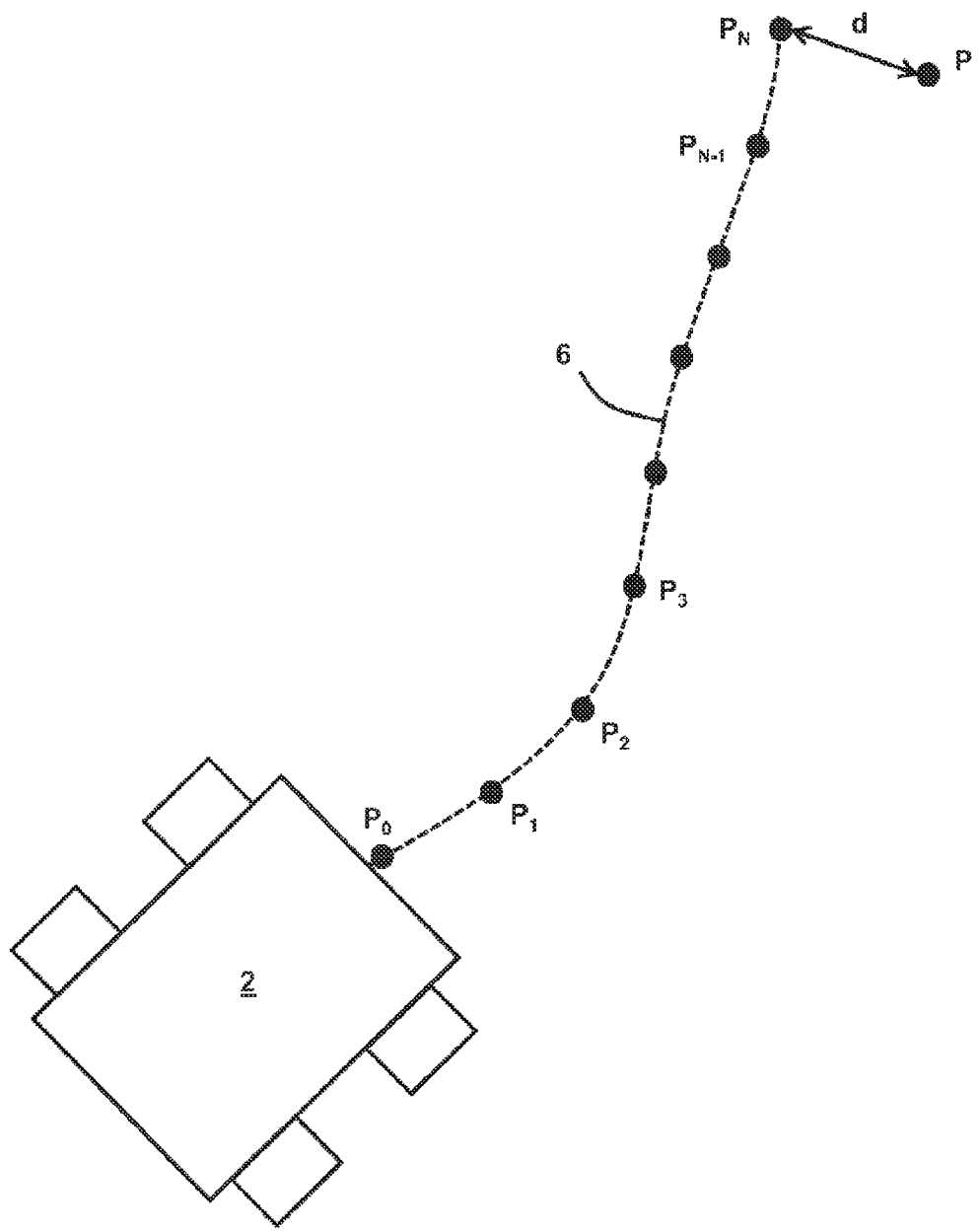
FIG. 2 is a schematic illustration (not to scale) of a scenario in which the vehicle travels along a trajectory.

FIG. 2 is a schematic illustration (not to scale) of a scenario in which the vehicle 2 travels along a trajectory 6 (indicated by a dotted line in FIG. 2).

The trajectory 6 is divided into a series of points $p_0, p_1, p_2, \ldots, p_N$. The ith point on the trajectory 6, i.e. $p_i$ is a position occupied by the vehicle at an ith time-step.

State vectors of the vehicle 2 at each of the points $p_0, \ldots, p_N$ of the trajectory 6 are $x(0), \ldots, x(N)$ respectively. In other words, x(i) denotes the state of the vehicle 2 at the ith time-step. Also, an initial state of the vehicle 2, i.e. a state of the vehicle 2 at the start of the trajectory 6, is $x_0$.

A desired terminal position of the vehicle 2 is indicated in FIG. 2 by the point P.

In this embodiment, the starting position $p_0$ and the desired terminal position P are identified for the vehicle 2, for example by a user/operator of the vehicle 2, by any appropriate manner. As used herein, the terminology "identified" includes any appropriate form of identifying, selecting, choosing, establishing, acquiring etc.

A state of the vehicle 2 at the desired terminal position P is $x_P$.

Thus, it is desirable for the vehicle 2 to follow a trajectory 6 such that the distance d between the desired terminal position P, and the terminal position of the vehicle 2 after following the trajectory 6, i.e. the point $p_N$, is minimised. In other embodiments, a 'stage cost' is also minimised.

In this embodiment, such an optimal trajectory (a trajectory that minimises the distance between P and $p_N$) is determined by a trajectory planner (not shown in the Figures).

In this embodiment, the determination of the optimal trajectory is implemented using the following equation:

$$\min_{u,x} g(x, u)$$

where the value function is given by $$g(x,u) = \|[I\ 0](x(N) - x_P)\|$$

In other embodiments this may also include cost term associated with traversing the trajectory, such as time or distance.

In this embodiment the optimisation problem is subject to the following constraints:

$$x(0) = x_0$$

$$x(k+1) = Ax(k) + Bu(k)$$

$$([0\ I]x(k), u(k)) \in L$$

where:
- g(x,u) is a value function that defines optimality;
- I is a (2×2) identity matrix; and
- L is a net of acceptable states $(v_x, v_y)$ and controls $(a_x, a_y)$. Here, $v_x$ is the speed of the vehicle 2 in the x-direction, $v_y$ is the speed of the vehicle 2 in the y-direction, $a_x$ is the acceleration of the vehicle 2 in the x-direction, and $a_y$ is the acceleration of the vehicle 2 in the y-direction.

In this embodiment, L is used to constrain the magnitude of the speed and the acceleration of the vehicle 2.

Thus, the above equation provides that the Euclidean distance between x(N) and xp is minimised (the velocity components of the state vector, x, are multiplied by 0 to remove them).

In this embodiment, the above described constraint equations are used. However, in other embodiments different constraint equations may be used instead of, or in addition to, some or all of the above constraint equations. For example, in other embodiments, constraint equations may be used that provide that a control effort for the vehicle 2, or a number of time-steps to reach the destination, is minimised.

The above equation for determining the optimal trajectory does not take into account the heading 4 of the vehicle 2. Thus, a trajectory determined using this equation alone may, at a certain point, include motion that cannot be performed by the vehicle 2 used in this embodiment. For example, the trajectory 6 determined as described above may require that, at a certain point, the vehicle 2 travels in a direction that is perpendicular to the vehicle's heading 4 at that point. Such a trajectory cannot be followed by the vehicle 2 of this embodiment (i.e. a land-based vehicle) because it would require an infinitely large turn-rate.

Conventionally, this constraint on the vehicle's turn rate is treated as an acceleration constraint. "*Receding Horizon Control In Unknown Environments: Experimental results*", Markus Deittert, Arthur Richards, and George Mathews, ICRA, Achorage, Ak., USA, May 2010, which is incorporated herein by reference, shows an implementation in which the magnitude of the vehicle's input vector u (i.e. an acceleration) is limited in relation to the vehicles maximum velocity, $V_{max}$, such that a minimum turn radius, $R_{min}$, is enforced, i.e.:

$$a_{max} = \frac{V_{max}^2}{R_{min}}$$

Thus, conventionally, trajectories that include a turn having a turn radius of less than $R_{min}$ tend to be avoided by the vehicle travelling at velocities close to its maximum, $V_{max}$.

In this embodiment, linear approximation the maximum acceleration of the vehicle 2 is implemented.

The magnitude of the velocity of the vehicle |v|, and maximum acceleration of the vehicle $a_{max}$, are related by a non-linear function. Conventionally, this non-linear function cannot be used directly in the optimisation of the trajectory 6. However, in this embodiment the nonlinear function is approximated by a collection of linear functions.

In this embodiment, the vehicle's velocity vector at the kth time step is:

$$v(k)=(v_x,v_y)^T$$

where:

$v_x$ is the speed of the vehicle 2 in the x-direction at the kth time-step; and $v_y$ is the speed of the vehicle 2 in the y-direction at the kth time-step.

In this embodiment, the ∞-norm of the velocity of the vehicle $v(k)=(v_x,v_y)^T$ is used. This advantageously relates the amount of acceleration available to the trajectory planner to the largest component within the speed vector, v.

FIGS. 3 to 6 are schematic illustrations that are useful for understanding optional additional techniques that may be implemented with is embodiment, and will be described in more detail later below.

Figure 7:
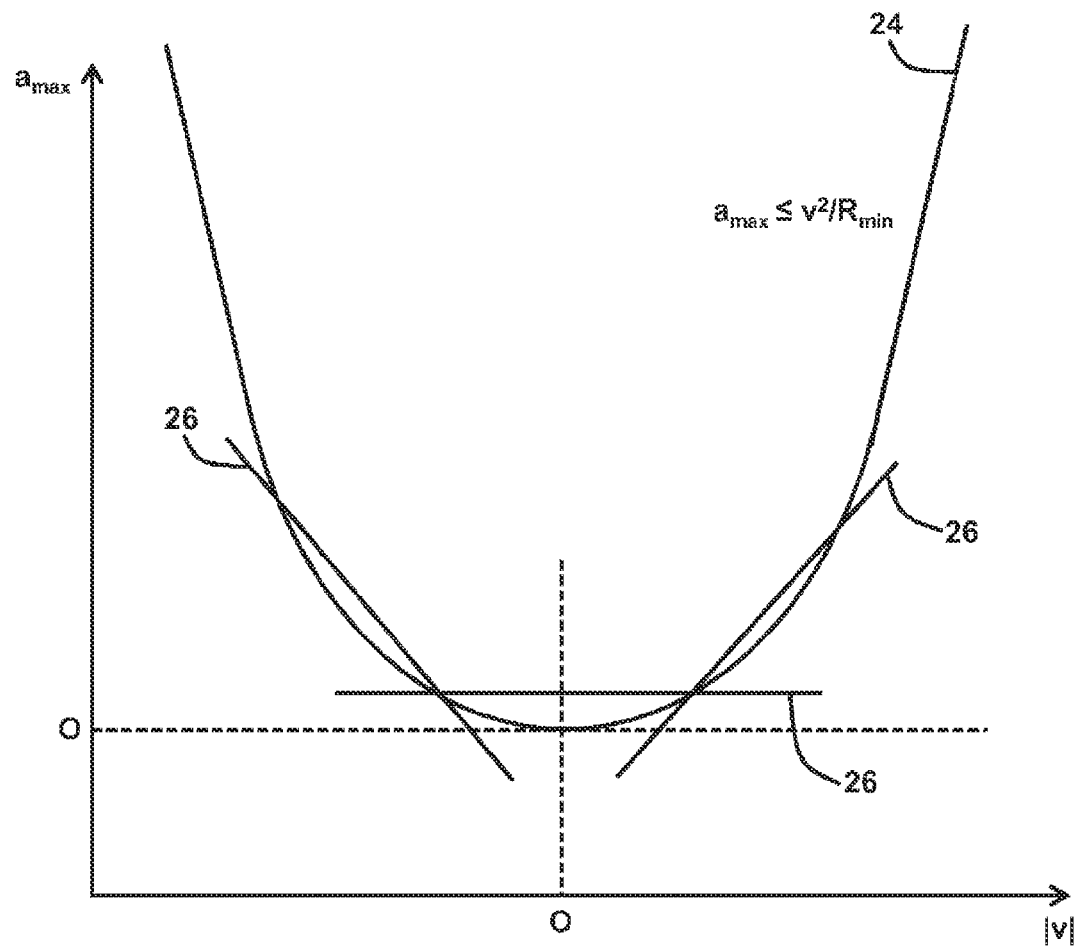
FIG. 7 is a schematic illustration (not to scale) of a graph showing the non-linear relationship between a maximum acceleration of the vehicle and an ∞-norm of the velocity of the vehicle.

FIG. 7 is a schematic illustration (not to scale) of a graph showing the non-linear relationship between maximum acceleration of the vehicle $a_{max}$, the ∞-norm of the velocity of the vehicle 14 and the minimum turn radius $R_{min}$. In FIG. 7 this non-linear function is indicated by the reference numeral 24, and each of the collection of linear functions that are used to approximate the nonlinear function 24 are indicated by the reference numeral 26.

In this embodiment, the following constraints on the acceleration vector of the vehicle $a(k)=(a_x,a_y)^T$ and the velocity vector of the vehicle $v(k)=(v_x,v_y)^T$ are implemented:

$$\forall k \in [0, \ldots, N_{steps}], \forall m \in [1, \ldots, N_{cir}] \quad (i)$$
$$a_x(k)\sin\left(\frac{2\pi m}{N_{cir}}\right) + a_y(k)\cos\left(\frac{2\pi m}{N_{cir}}\right) \leq a_{max}(k)$$

$$\forall k \in [0, \ldots, N_{steps}], \forall p \in [1, \ldots, N_{pol}] \quad (ii)$$
$$m(p)v_x(k) + c(p) \geq a_{max}(p) - C_L b1(k,p)$$
$$m(p)v_y(k) + c(p) \geq a_{max}(p) - C_L b2(k,p)$$

$$\forall k \in [0, \ldots, N_{steps}] \quad (iii)$$
$$\sum_{p=1}^{N_{pol}} (b1(k,p) + b2(k,p)) \leq 2N_{pol} - 1$$

$$\forall k \in [0, \ldots, N_{steps}] \quad (iv)$$
$$a_{max}(k) \geq 0$$

where:

$N_{steps}$ is a number of time-steps;

$N_{cir}$ is a number of corners of a polygon (a convex polynomial approximation of a circle). This polygon approximates a circle having a radius equal to $a_{max}$;

$N_{pol}$ is the number of linear functions 26 that are used to approximate the nonlinear function 24;

m(p) is the value of the gradient of the pth linear function 26 c(p) is the value of the '$a_{max}$-intercept' of the pth linear function 26, i.e. the value of the pth linear function 26 if the value of the velocity was zero;

b1(k,p) and b2(k,p) are constants the values of which provide that at least one of the equations of the second constraint (i.e. constraint (ii)) are fulfilled by a value of $a_{max}$; and $C_L$ is a constant.

The first of the above constraints, i.e. constraint (i), provides that the magnitude of the acceleration vector $a(k)=(a_x, a_y)^T$ is limited, i.e. that the magnitude of the acceleration vector is less than or equal to $a_{max}$ for a particular time-step.

The second of the above constraints, i.e. constraint (ii), provides that the maximum acceleration of the vehicle $a_{max}$ is less than or equal to the approximated non-linear function 24;

The third of the above constraints, i.e. constraint (iii), provides that a trajectory planner implementing the above constraints (i)-(iv) bases a value of $a_{max}$ on the x-component or y-component of the velocity vector v. The ∞-norm of the velocity vector v is thereby implemented.

The fourth of the above constraints, i.e. constraint (iv), provides that the maximum acceleration $a_{max}$ is always positive.

Thus, a technique by which a vehicle trajectory may be determined using a trajectory planner is provided. The above described constraints applied to the trajectory planner, i.e. that the magnitude of acceleration of the vehicle (not the direction) is constrained, advantageously tend to provide that the determined trajectory is able to be followed by a vehicle (e.g. a wheeled land vehicle) that has a limited turn-rate.

The above described embodiment, in which the trajectory is constrained in such a way that inter alia the maximum value of the acceleration of the vehicle $a_{max}$ is a function of either the x-component or y-component of the velocity vector v, advantageously tends to provide that the trajectory planner tends not to be able to produce trajectories which require, at a particular point in time, the vehicle 2 to travel perpendicular to its heading 4.

A further advantage provided by the above described trajectory planner constraint is that the performance of the trajectory planner and/or the vehicle, in particular when the vehicle travels at relatively low speeds, tends to be improved over conventional approaches.

A further advantage provided by the above described embodiment is that a linear approximation of the vehicle's dynamics is advantageously constrained. In particular, in the above embodiment the magnitude of the vehicle acceleration in a direction perpendicular to the vehicle's heading is constrained. This is achieved by linear approximation of the acceleration limit of the vehicle (i.e. the maximum acceleration). In other words, constraints on the trajectory of the vehicle are implemented in the acceleration space of the vehicle. In particular, the magnitude of the maximum acceleration is constrained depending on the velocity vector v.

In other embodiments, the above described approach may be combined with one or more of the following additional optional techniques.

The conventional approach of transforming the vehicle's turn rate limit into an acceleration constraint tends to fail at low speeds. In particular, if the vehicle slows down, the enforcement of $$a_{max} = \frac{V_{max}^2}{R_{min}}$$

tends to result in trajectories comprising turns with a turn radius less than $R_{min}$.

In a first additional optional technique, a minimum constraint to the vehicle's velocity is used. This constraint provides that the minimum speed of the vehicle 2, denoted hereinafter as "$V_{min}$", is close to the maximum speed of the vehicle 2.

In this embodiment, this minimum speed constraint is enforced as follows.

Figure 3:
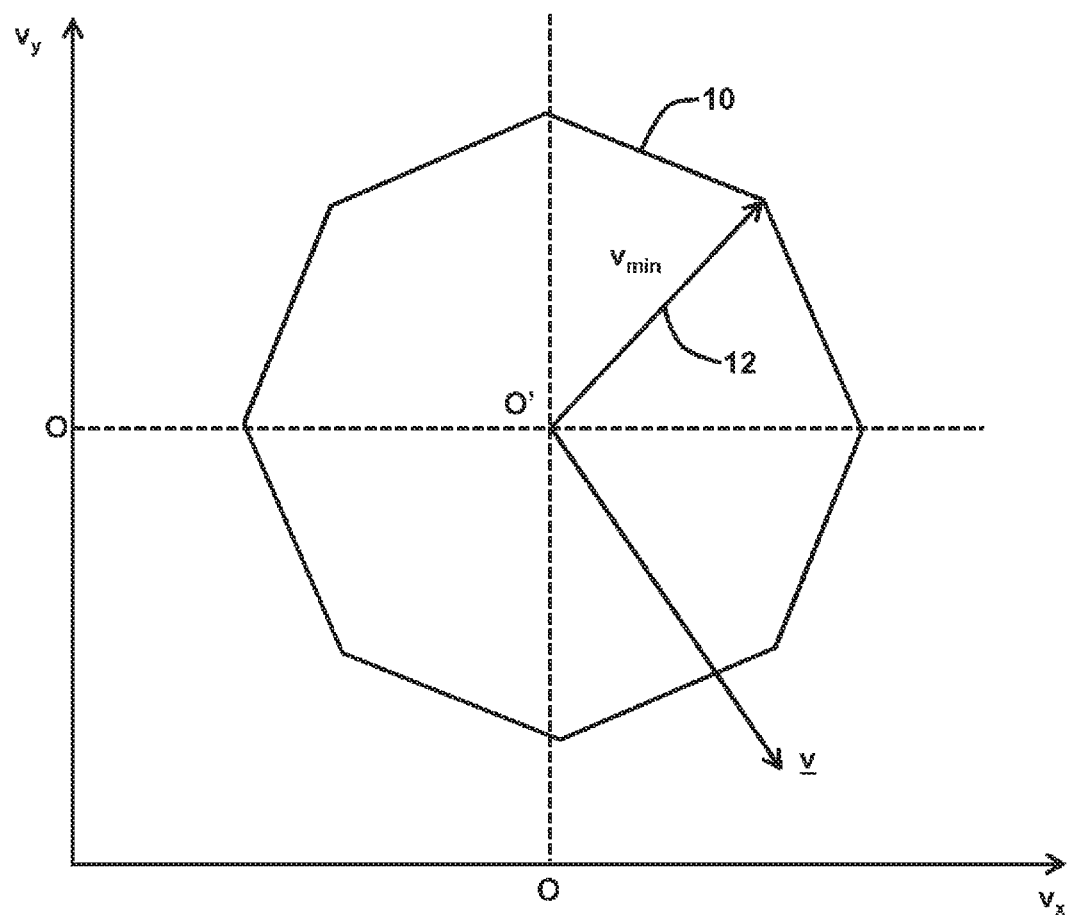
FIG. 3 is a schematic illustration (not to scale) representing a velocity space of the vehicle.

FIG. 3 is a schematic illustration representing a space of the vehicle's velocity, hereinafter referred to as the "velocity plane 8".

A convex polynomial approximation of a circle is indicated by the reference numeral 10 and is hereinafter referred to as the "polygon". The polygon 10 approximates a circle having a radius equal to $V_{min}$, indicated in FIG. 3 by an arrow and the reference numeral 12. Also, the polygon 10 is centred at the origin O' of the velocity plane 8.

The vehicle's velocity vector v(k) is constrained to remain outside the polygon 10, i.e.

$$\forall k \in [0, \ldots, N_{steps}], \forall m \in [1, \ldots, N_{circ}]$$
$$v_x(k)\sin\left(\frac{2\pi m}{N_{circ}}\right) + v_y(k)\cos\left(\frac{2\pi m}{N_{circ}}\right) \geq V_{min} - p(k, m) \cdot C_L$$

with $$\forall k \in [0, \ldots, N_{steps}]$$

$$\sum_{m=1}^{N_{circ}} p(k, m) = N_{circ} - 1$$

Where:
$N_{steps}$ is the number of time-steps;
$N_{circ}$ is the number of corners of the polygon 10;
p(k,m) is a binary decision variable. In this embodiment p(k,m) is a matrix of size $N_{steps} \times N_{circ}$ with an entry (equal to zero or one) for each time-step k and polygon corner m. In this embodiment, p(k,m) is used to deactivate constraints; and $C_L$ is an arbitrary constant. In this embodiment $C_L$ is relatively large compared to $V_{min}$.

The above velocity constraint is satisfied either by v(k) being outside the polygon 10, or by each value in the matrix p(k,m) being equal to one. The constraint $$\sum_{m=1}^{N_{circ}} p(k, m) = N_{circ} - 1$$

provides that only $N_{circ}-1$ entries of p(k,m) are equal to one. Thus, v(k) must be outside of the polygon 10.

Thus, a first additional technique by which a vehicle trajectory may be determined using a trajectory planner is provided. The above described constraints applied to the trajectory planner, i.e. the constraints on the vector v, advantageously tend to provide that the determined trajectory is able to be followed by a vehicle (e.g. a wheeled land vehicle) that has a curvature limit.

The above described embodiment, in which a constraint on the velocity vector v of the vehicle 2 is applied, advantageously tends to provide that the trajectory planner tends not to be able to produce trajectories which require, at a particular point in time, the vehicle 2 to travel perpendicular to its heading 4.

A further advantage provided by the above described trajectory planner constraint is that the performance of the trajectory planner and/or the vehicle, in particular when the vehicle travels at relatively low speeds, tends to be improved compared to the conventional approach. Performance may, for example, be measured as the error between the turn radii of the optimal linear trajectory and the turn radius limit of the non-linear vehicle dynamics.

A further advantage provided by the above described embodiment is that a linear approximation of the vehicle's dynamics is advantageously constrained. In particular, in the above embodiment the magnitude of the vehicle acceleration in a direction perpendicular to the vehicle's heading is constrained. This is achieved by constraining the velocity vector of the vehicle as described above. In other words, constraints on the trajectory of the vehicle are implemented in the velocity space of the vehicle.

A second additional technique involves permitting an acceleration of the vehicle 2 that changes the direction of the vehicle 2, but that does not significantly change the norm of the vehicle's velocity.

This is achieved by requiring that the acceleration primarily acts in directions that are normal (i.e. perpendicular) to the velocity vector v.

Figure 4:
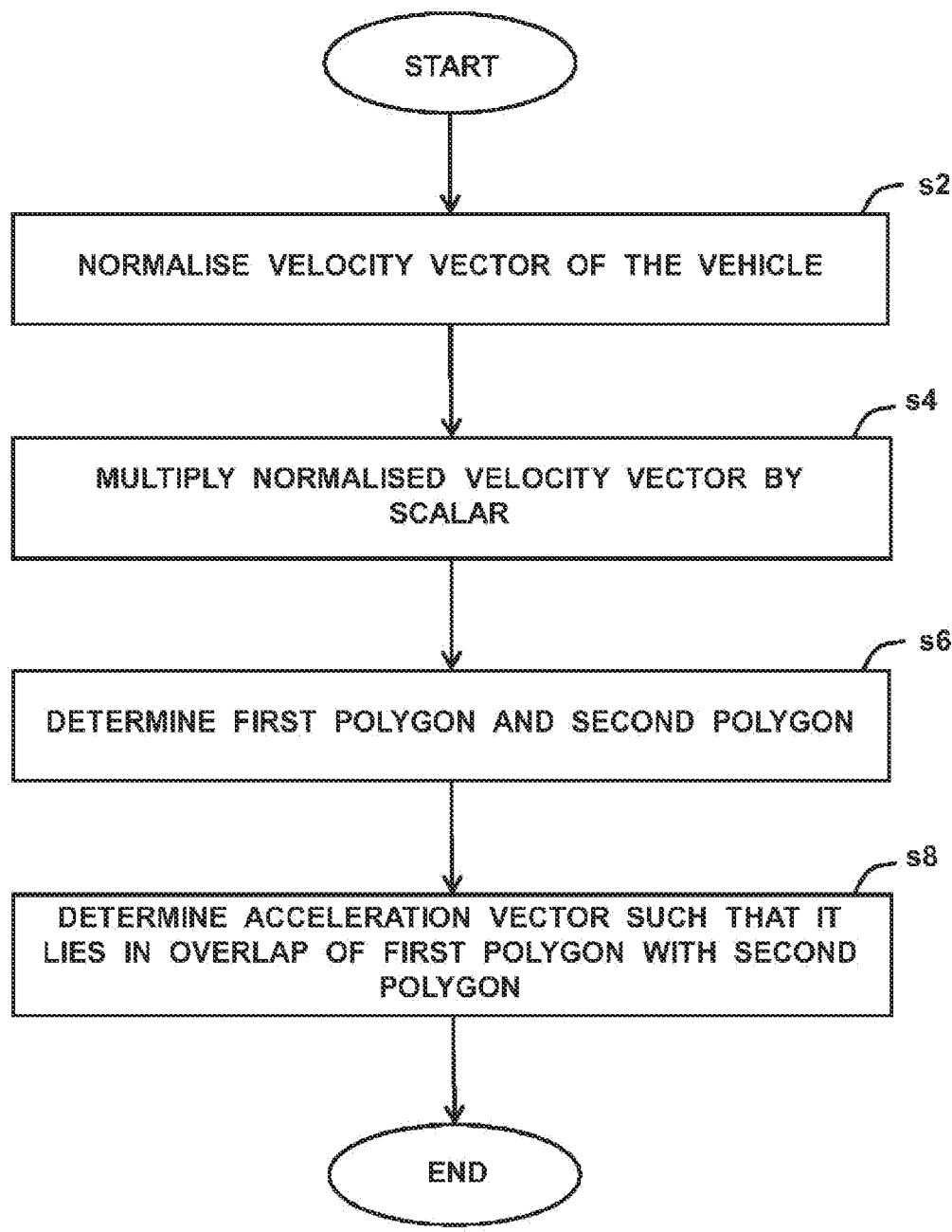
FIG. 4 is a process flow chart showing certain steps of a process of determining a constrained acceleration vector for the vehicle.

FIG. 4 is a process flow chart showing certain steps of a process of determining a constrained acceleration vector for the vehicle 2 according to the second additional technique.

Figure 5:
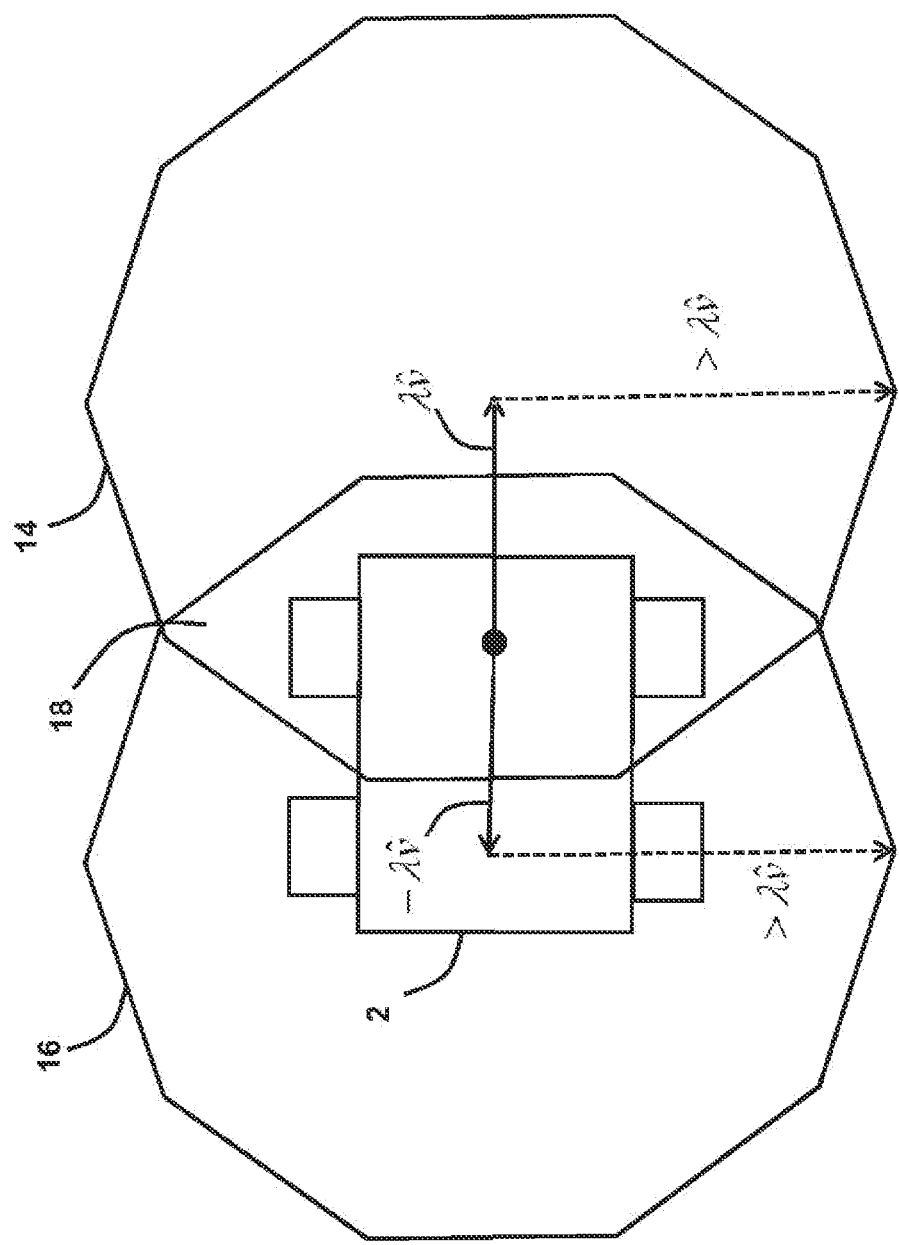
FIG. 5 is a schematic illustration (not to scale) that is useful in the understanding of the process of FIG. 4.

FIG. 5 is a schematic illustration that is useful in the understanding of the process of FIG. 4.

At step s2, the velocity vector v of the vehicle 2 is normalised.

At step s4, the normalised velocity vector $\hat{v}$ is multiplied by a scalar quantity $\lambda$.

At step s6, two convex polynomial approximations of a circle, hereinafter referred to as "the first polygon" and the "second polygon" and indicated in FIG. 5 by the reference numerals 14 and 16 respectively, are determined.

The first polygon 14 is centred at a point $\lambda\hat{v}$.

The second polygon 16 is centred at a point $-\lambda\hat{v}$.

The radii of the first and second polygons 14, 16 are indicated in FIG. 5 by dotted arrows. These radii are larger than the length of the vector $\lambda\hat{v}$. This provides that the first and second polygons 14, 16 overlap to some extent.

At step s8, an acceleration vector a of the input vector is determined such that it lies within an overlap 18 of the first polygon 14 with the second polygon. This provides that the acceleration applied to the vehicle 2 may be relatively large when acting in a direction that is substantially perpendicular to the velocity vector v of the vehicle 2, but is relatively small when acting in a direction that is substantially parallel to the velocity vector v of the vehicle 2.

If $\lambda$ is selected to be a relatively large value, e.g. $\lambda=10$, the resulting overlap 18 is relatively small in a direction that is substantially parallel to the velocity of the vehicle v, but is relatively large in a direction that is substantially normal to the velocity vector v. The value of $\lambda$ may advantageously be selected depending on the application.

Due to the first and second polygons 14, 16 being centred around points, the position of which depends on the normalised velocity vector $\hat{v}$, if the vehicle 2 slows down, the overlap 18 increases relative to the velocity vector v. This advantageously tends to provide that, at low speeds, a relatively large acceleration may be applied to the vehicle in a direction that is substantially parallel to the velocity vector v, thereby allowing the magnitude of the velocity vector v to be increased.

The process of determining an acceleration vector for the vehicle 2 described above with reference to FIGS. 4 and 5 is equivalent to determining an acceleration vector $$a(k) = \begin{pmatrix} a_x \\ a_y \end{pmatrix}$$

for the vehicle 2 that is constrained as follows:

$$\forall k \in [0, \ldots, N_{steps}], \forall m \in [1, \ldots, N_{circs}]$$

$$\left(\frac{a_x(k)R_{min}}{V_{max}} - \frac{\lambda v_x(k)}{V_{max}}\right)\cos\left(\frac{2\pi m}{N_{circs}}\right) +$$

$$\left(\frac{a_y(k)R_{min}}{V_{max}} - \frac{\lambda v_y(k)}{V_{max}}\right)\sin\left(\frac{2\pi m}{N_{circs}}\right) \leq \sqrt{1 + \lambda^2}$$

where $$v(k)=(v_x,v_y)^T; \text{ and}$$

where:

$N_{circs}$ is the number of corners of the first and second polygons 14, 16. In other embodiments, the first polygon 14 may have a different number of corners to the second polygon 16 (and the above equation is modified accordingly).

Thus, a second additional, optional technique by which a vehicle trajectory may be determined using a trajectory planner is provided. The above described constraints applied to the trajectory planner, i.e. the constraints on the vector v, advantageously tend to provide that the determined trajectory is able to be followed by a vehicle (e.g. a wheeled land vehicle) that has a limited turn-rate.

The above described embodiment, in which a constraint on the acceleration vector a of the vehicle 2 is applied, advantageously tends to provide that the trajectory planner tends not to be able to produce trajectories which require, at a particular point in time, the vehicle 2 to travel perpendicular to its heading 4.

A further advantage provided by the above described trajectory planner constraint is that the performance of the trajectory planner and/or the vehicle, in particular when the vehicle travels at relatively low speeds, tends to be improved.

A further advantage provided by the above described embodiment is that a linear approximation of the vehicle's dynamics is advantageously constrained. In particular, in the above embodiment the magnitude of the vehicle acceleration in a direction perpendicular to the vehicle's heading is constrained. This is achieved by scaling the components of the acceleration vector (i.e. the components $a_x$ and $a_y$) depending of the respective components of the velocity vector (i.e. the components $v_x$ and $v_y$ respectively). In other words, constraints on the trajectory of the vehicle are implemented in the acceleration space of the vehicle. In particular, the magnitude and the direction of the vehicle's acceleration is constrained.

A third additional technique involves constraining a trajectory planner such that it may not plan trajectories that require the vehicle 2 to travel in regions that limitations on the vehicle's turning circle prevent it from travelling in.

In particular, for curvature limited vehicles, which cannot turn on the spot, there exists a circular area to each side of the vehicle that cannot be reached by turning directly into it, for example without repeatedly reversing and advancing. The radius of these circles is substantially equal to the vehicle's minimum turn radius, $R_{min}$.

Figure 6:
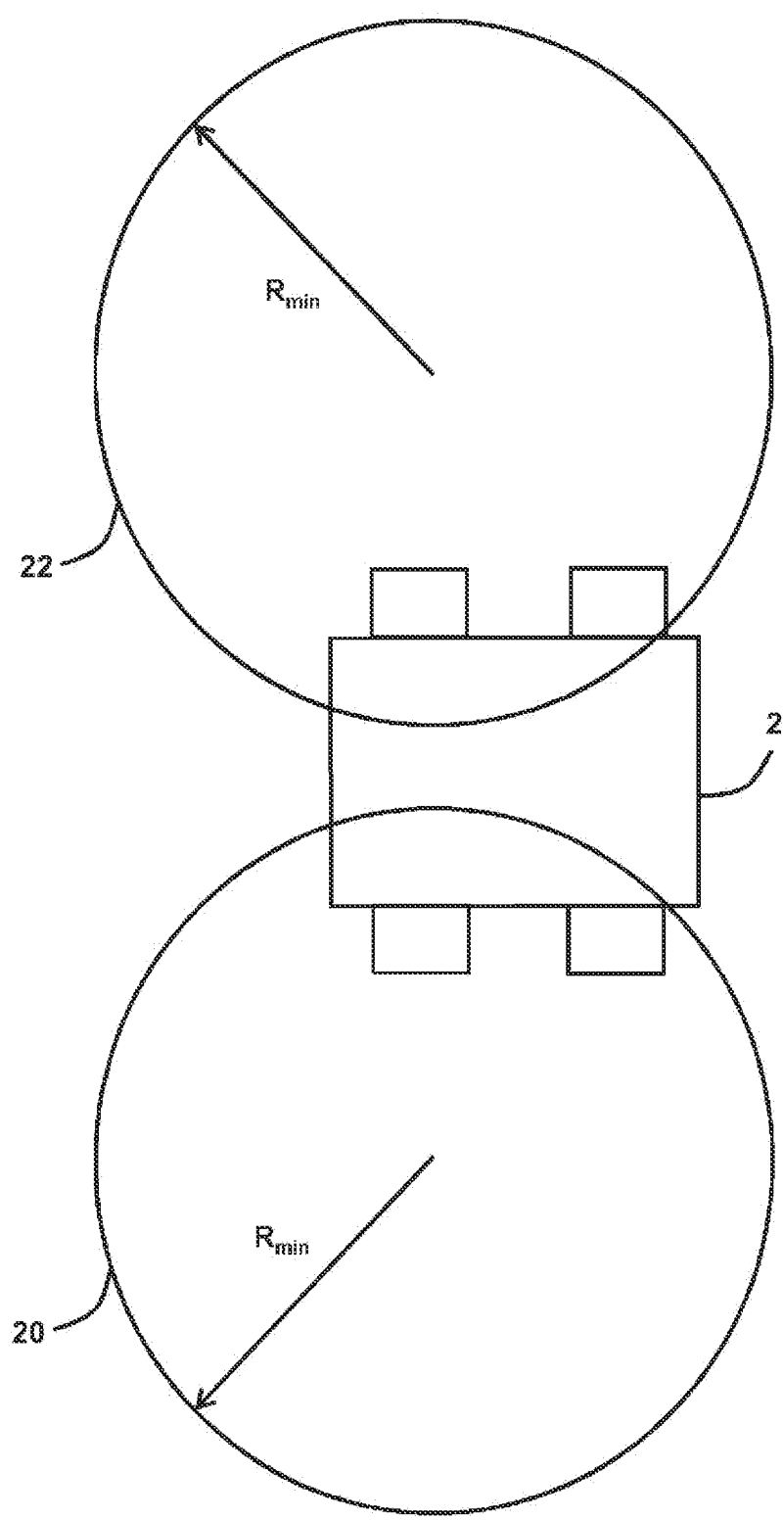
FIG. 6 is a schematic illustration (not to scale) showing the vehicle and two regions into which the vehicle may not directly move.

FIG. 6 is a schematic illustration showing the vehicle 2 and two regions, hereinafter referred to as the "first region 20" and the "second region 22", into which the vehicle 2 may not directly move, i.e. turn directly into.

The vehicle 2 may not move into the first or second region due to the vehicle's curvature limitations. The first and second region 20, 22 are avoided by the trajectory planner when planning a trajectory. The first and second regions 20, 22 may be considered to be 'obstacles' that are to be avoided when planning a trajectory of the vehicle 2.

In embodiments in which the third additional technique is implemented, the first and second regions 20, 22 are approximated by polygons, and the constraint on the trajectory of the vehicle 2 is implemented as follows.

A unit vector normal to the initial speed vector of the vehicle v(0) is:

$$\hat{v}_n = (v_{nx}, v_{ny})^T = \frac{(v_y(0), -v_x(0))}{\sqrt{v_x^2(0) + v_y^2(0)}}$$

where:

$v_{nx}$ is the component of the vector $\hat{v}_n$ in the x-direction; and
$v_{ny}$ is the component of the vector $\hat{v}_n$ in the y-direction.

An initial position of the vehicle 2 is given by: $r_0=(r_{0x}, r_{0y})^T$.

In embodiments in which the third additional technique is implemented, the constraint on the trajectory of the vehicle 2 supplied by one of the region 20, 22 is implemented as follows:

$$\forall k \in [0, \ldots, N_{steps}], \forall m \in [1, \ldots, N_{regions}]$$

$$(r_x(k) - r_{0x} - R_{min}v_{nx})\cos\left(\frac{2\pi m}{N_{regions}}\right) +$$

$$(r_y(k) - r_{0y} - R_{min}v_{ny})\sin\left(\frac{2\pi m}{N_{regions}}\right) \geq R_{min} - C_L p(k, m)$$

-continued with $\forall k \in [0, \ldots, N_{steps}]$ $$\sum_{m=1}^{N_{circ}} p(k, m) = N_{regions} - 1$$

where:

$N_{steps}$ is the number of time-steps;

$N_{regions}$ is the number of corners of the polygons used to approximate the first or second regions 20, 22. In this embodiment, the polygons used to approximate the first and second regions 20, 22 comprise the same number of points. However, in other embodiments these polygons may comprise a different number of points. In such cases the above equations may be modified accordingly;

p(k,m) is a binary decision variable. In this embodiment p(k,m) is a matrix of size $N_{steps} \times N_{regions}$ with an entry (equal to zero or one) for each time-step k and polygon corner m. In this embodiment, p(k,m) is used to deactivate constraints; and $C_L$ is an arbitrary constant greater than $R_{min}$. In this embodiment $C_L$ is equal to $2 \times R_{min}$.

The constant $C_L$ may be advantageously selected depending on the application.

Constraining the trajectory in this way advantageously tends to provide that vehicle 2 may follow the trajectory, even at relatively low speeds. This tends to be particularly useful when planning a trajectory from a resting position or in a cluttered surrounding.

Thus, a third additional, optional technique by which a vehicle trajectory may be determined using a trajectory planner is provided. The above described constraints applied to the trajectory planner, i.e. the constraints on a position vector $r(k)=(r_x,r_y)$ of the vehicle, advantageously tend to provide that the determined trajectory is able to be followed by a vehicle (e.g. a wheeled land vehicle) that has a curvature limit.

The above described embodiment, in which the trajectory is required to provide that the vehicle 2 avoids regions close to, and either side of, the vehicle (as described above with reference to FIG. 6), advantageously tends to provide that the trajectory planner tends not to be able to produce trajectories which require, at a particular point in time, the vehicle 2 to travel perpendicular to its heading 4.

A further advantage provided by the above described trajectory planner constraint is that the performance of the trajectory planner and/or the vehicle, in particular when the vehicle travels at relatively low speeds, tends to be improved.

A further advantage provided by the above described embodiment is that a linear approximation of the vehicle's dynamics is advantageously constrained. In particular, in the above embodiment the magnitude of the vehicle acceleration in a direction perpendicular to the vehicle's heading is constrained. This is achieved by determining the components of the position vector (i.e. the components $r_x$ and $r_y$), which define a point that the vehicle will be moved to at a particular point in time (in effect the heading of the vehicle at a point in time) depending of the respective components of the velocity vector (i.e. the components $v_x$ and $v_y$ respectively). In other words, constraints on the trajectory of the vehicle are implemented in the positional space (i.e. x-y space) of the vehicle.

One or more of the above described optional additional techniques for constraining a trajectory determined by a trajectory planner may advantageously be implemented in conjunction with, or instead of, the constraints described above with reference to FIG. 7. It may be desirable to use different sets of constraints in different situations. For example, in a case in which the vehicle starts with zero velocity, the acceleration limit constraint of the second additional technique tends to be inappropriate (the vehicle is prevented from moving). However, when the vehicle is operating at high speed, this set of constraints tends to more desirable over the positional constraints of the third additional technique.

Different sets of constraints (i.e. the velocity constraints described above with respect to FIG. 7, or the constraints relating to any of the above described additional technique) may be implemented by a trajectory planner contemporaneously or in series. How the constraints are implemented, i.e. in what order and for what proportion of the vehicle's trajectory, may advantageously be selected depending on the application. For example, in another embodiment two sets of constraints may be applied at different times: the positional constraints of the third additional technique may be implemented for a first half of a vehicle's trajectory, and the acceleration constraint of the second additional technique may be implemented for the later half. In another embodiment, a point in time at which a constraint set being implemented by a trajectory planner is changed may be decided using a binary decision variable. In such a way, the change over from one set of constraints to another can advantageously be tied to the vehicle's state.

Apparatus, including the trajectory planner (not shown in the Figures), for implementing the above arrangement, and performing any of the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 4 and described above may be omitted or such process steps may be performed in differing order to that presented above and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the vehicle is a land-based vehicle, e.g. a vehicle comprises wheels and/or tracks. However, in other embodiments the vehicle may be any appropriate vehicle that has a curvature limit, e.g. a boat, submarine, or amphibious vehicle. Also, the vehicle may be manned or unmanned.

In the above embodiments, the constraints that are implemented by the trajectory planner are expressed by the relevant above described equations. In other embodiments, one or more of the constraints may be implemented using a different appropriate equation so as to provide an equivalent constraining effect on the trajectory planner, and/or provide the equivalent functionality to that described above.

In the above embodiments, the polygons used in the linear approximations may comprise any appropriate number of corners. Generally, the greater the number of corners used for the polygon(s), the greater the accuracy of the approximation to the circles it/they represent tend to be. However, the greater the number of corners of the polygon(s), the more processing power is required. Thus, a trade-off exists between accuracy and processing power. The number of corners for each of the polygons used may be selected. A trade-off exists between the accuracy of the approximation and the processing power required to perform the approximation in a certain amount of time. The number of corners for each polygon may be advantageously selected to achieve a desired balance between accuracy and processing power.

The invention claimed is:

1. A method for controlling a land vehicle having a curvature limit according to a trajectory, the method comprising:
   identifying a starting position ($p_0$) for the vehicle;
   identifying a desired terminal position (P) for the vehicle;
   defining a linear approximation of dynamics of the land vehicle with a state vector (x) that indicates land vehicle velocity with linearized variables that lack non-linear heading information;
   determining, based on the starting position ($p_0$), the desired terminal position (P), and the linear approximation, by the one or more processors, an acceleration input (u) that optimizes a linear time invariant system having a form $\dot{x}=Ax+Bu$ against a cost function and with constraints applied to accomplish the trajectory for the land vehicle;
   wherein the constraints include:
      a first constraint that magnitude of the acceleration input is less than or equal to a maximum acceleration for each time-step of the trajectory;
      a second constraint that maximum acceleration of the vehicle is less than or equal to a non zero approximated non-linear function of velocity squared divided by a minimum turn radius of the land vehicle;
      a third constraint that values for maximum acceleration input are based on an x-value or a y-value of velocity as expressed by state vector (x); and
      a fourth constraint that the maximum acceleration is positive; and
   controlling the land vehicle to follow the trajectory.

2. A method according to claim 1, wherein the constraints are implemented by calculating:

$$\forall k \in [0, \ldots, N_{steps}], \forall m \in [1, \ldots, N_{cir}] \quad \text{(i)}$$
$$a_x(k)\sin\left(\frac{2\pi m}{N_{cir}}\right) + a_y(k)\cos\left(\frac{2\pi m}{N_{cir}}\right) \leq a_{max}(k)$$

$$\forall k \in [0, \ldots, N_{steps}], \forall p \in [1, \ldots, N_{pol}] \quad \text{(ii)}$$
$$m(p)v_x(k) + c(p) \geq a_{max}(p) - C_L b1(k, p)$$
$$m(p)v_y(k) + c(p) \geq a_{max}(p) - C_L b2(k, p)$$

$$\forall k \in [0, \ldots, N_{steps}] \quad \text{(iii)}$$
$$\sum_{p=1}^{N_{pol}} (b1(k, p) + b2(k, p)) \leq 2N_{pol} - 1$$

$$\forall k \in [0, \ldots, N_{steps}] \quad \text{(iv)}$$
$$a_{max}(k) \geq 0$$

where:
$a_{max}$ is a maximum acceleration of the vehicle;
$a_x$ is an acceleration of the vehicle in an x-direction;
$a_y$ is an acceleration of the vehicle in a y-direction;
$v_x$ is a velocity of the vehicle in an x-direction;
$v_y$ is a velocity of the vehicle in a y-direction;
$N_{steps}$ is a number of time-steps for the trajectory;
$N_{cir}$ is a number of corners of a polygon;
$N_{pol}$ is a number of linear functions, each linear function relating the maximum acceleration of the vehicle to an infinity norm of the velocity of the vehicle;
m(p) is a value of a gradient of a pth linear function;
c(p) is a value of pth linear function if the value of the velocity of the vehicle is zero;
b1(k, p) and b2(k, p) are constants; and
$C_L$ is a constant.

3. A method according to claim 1, wherein the constraints also include a constraint that a magnitude of the velocity of the vehicle is greater than or equal to a threshold value for the velocity that is implemented by calculating:

$$\forall k \in [0, \ldots, N_{steps}], \forall m \in [1, \ldots, N_{circ}]$$
$$v_x(k)\sin\left(\frac{2\pi m}{N_{circ}}\right) + v_y(k)\cos\left(\frac{2\pi m}{N_{circ}}\right) \geq V_{min} - p(k, m) \cdot C_1$$

and $$\forall k \in [0, \ldots, N_{steps}]$$
$$\sum_{m=1}^{N_{circ}} p(k, m) = N_{circ} - 1$$

where:
$v_x(k)$ is the velocity of the vehicle in an x-direction;
$v_y(k)$ is the velocity of the vehicle in a y-direction;
$V_{min}$ is the threshold velocity value;
$N_{steps}$ is a number of time-steps for the trajectory;
$N_{circ}$ is a number of corners of a polygon;
p(k,m) is a binary decision variable; and
$C_1$ is a constant.

4. A method according claim 3, wherein $C_1$ is larger than $V_{min}$.

5. A method according to claim 1, wherein:
the linear approximation is constrained by a specification that the vehicle not travel in a given region;
a centre point of the region is at a distance from a predetermined point on the vehicle substantially equal to a minimum turn radius of the vehicle, in a direction substantially perpendicular to a velocity of the vehicle; and
a distance from the centre point of the region to a point on a perimeter of the region is greater than or substantially equal to the minimum turn radius of the vehicle.

6. A method according to claim 5, wherein the constraint that the vehicle not travel in a given region is implemented by calculating:

$$\forall k \in [0, \ldots, N_{steps}], \forall m \in [1, \ldots, N_{regions}]$$
$$(r_x(k) - r_{0x} - R_{min}v_{nx})\cos\left(\frac{2\pi m}{N_{regions}}\right) +$$
$$(r_y(k) - r_{0y} - R_{min}v_{ny})\sin\left(\frac{2\pi m}{N_{regions}}\right) \geq R_{min} - C_2 p(k, m)$$

with $$\forall k \in [0, \ldots, N_{steps}]$$
$$\sum_{m=1}^{N_{circ}} p(k, m) = N_{regions} - 1$$

where:
$v_{nx}$ is a normalised velocity of the vehicle in an x-direction;
$v_{ny}$ is a normalised velocity of the vehicle in a y-direction;

$r_x(k)$ is a position of the vehicle from an origin in the x-direction;

$r_y(k)$ is a position of the vehicle from an origin in the y-direction;

$r_{0x}$ is an initial position of the vehicle from an origin in the x-direction;

$r_{0y}$ is an initial position of the vehicle from an origin in the y-direction;

$N_{steps}$ is a number of time-steps for the trajectory;

$N_{regions}$ is a number of corners of a polygon;

$R_{min}$ is a minimum turn radius of the vehicle;

p(k, m) is a binary decision variable; and $C_2$ is a constant.

7. A method according to claim 6, wherein $C_2$ is larger than $R_{min}$.

8. A method according to claim 1, wherein the vehicle has a curvature limit for its trajectory.

9. A method according to claim 1, further comprising:

using the starting position ($p_0$), the desired terminal position (P), and the linear approximation, and determining, by one or more processors, the trajectory for the land vehicle that optimizes a linear time invariant system having a form $\dot{x}=Ax+Bu$ against a cost function, without the first, second, third, and fourth constraints and with another constraint applied to the state vector (x) to determine an acceleration input (u) to be applied by the land vehicle to accomplish another portion of the trajectory.

10. Apparatus for controlling a land vehicle, the apparatus comprising one or more processors and at least one non-transitory computer readable storage medium having encoded thereon executable instructions that, when executed by the one or more processors, cause the one or more processors to carry out a method that includes:

linearly approximate dynamics of the land vehicle with a state vector (x) that indicates land vehicle velocity with linearized variables that lack non-linear heading information; and determine, based on an identified starting position ($p_0$) for the vehicle, an identified desired terminal position (P) for the vehicle, and the linear approximation, an acceleration input (u) that optimizes a linear time invariant system having a form $\dot{x}=Ax+Bu$ against a cost function and with constraints applied to accomplish a trajectory for the vehicle;

wherein the constraints include a first constraint that magnitude of the acceleration input is less than or equal to a maximum acceleration for each time-step of the trajectory;

a second constraint that maximum acceleration of the vehicle is less than or equal to a non zero approximated non-linear function of velocity squared divided by a minimum turn radius of the land vehicle;

a third constraint that values for maximum acceleration input are based on an x-value or a y-value of velocity as expressed by state vector (x); and a fourth constraint that the maximum acceleration is positive; and controlling the land vehicle to follow the trajectory.

* * * * *